(12) United States Patent
Piech

(10) Patent No.: US 6,604,745 B2
(45) Date of Patent: Aug. 12, 2003

(54) PROCESS AND DEVICE FOR OPERATING A MOTOR VEHICLE

(75) Inventor: Ferdinand Piech, Wolfsburg (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 10/263,645

(22) Filed: Oct. 4, 2002

(65) Prior Publication Data

US 2003/0029662 A1 Feb. 13, 2003

Related U.S. Application Data

(63) Continuation of application No. 09/600,699, filed as application No. PCT/EP99/00462 on Jan. 25, 1999.

(30) Foreign Application Priority Data

Jan. 29, 1998 (DE) .......................................... 198 03 370

(51) Int. Cl.$^7$ .......................................... B60G 17/005
(52) U.S. Cl. .................................. 280/5.502; 180/282
(58) Field of Search ............................... 180/282, 285, 180/275, 277, 274; 280/5.501, 5.502, 5.503, 5.504, 5.506, 5.507, 5.512, 5.515, 5.519; 701/39

(56) References Cited

U.S. PATENT DOCUMENTS

| | | | | |
|---|---|---|---|---|
| 3,938,823 A | * | 2/1976 | Hiruma | 280/6.158 |
| 4,411,334 A | * | 10/1983 | Schlanger | 180/274 |
| 4,671,534 A | * | 6/1987 | Yano | 280/5.508 |
| 4,886,291 A | * | 12/1989 | Okamoto | 280/707 |
| 5,144,559 A | * | 9/1992 | Kamimura et al. | 701/37 |
| 5,173,857 A | * | 12/1992 | Okuyama et al. | 701/37 |
| 5,383,680 A | * | 1/1995 | Bock et al. | 280/5.503 |
| 5,387,819 A | * | 2/1995 | Ueno et al. | 307/10.1 |
| 5,544,915 A | * | 8/1996 | Fendt et al. | 280/735 |
| 6,082,742 A | * | 7/2000 | Ishikawa | 280/5.508 |
| 6,182,783 B1 | * | 2/2001 | Bayley | 180/282 |

FOREIGN PATENT DOCUMENTS

| | | | | |
|---|---|---|---|---|
| DE | 3427508 A1 | * | 2/1986 | B60G/17/04 |
| DE | 4436162 C1 | * | 3/1996 | B60G/17/06 |
| GB | 2292126 A | * | 2/1996 | B60R/21/00 |
| JP | 58131442 A | * | 8/1983 | F16F/09/50 |
| JP | 04103420 A | * | 4/1992 | B60G/17/015 |
| JP | 0699713 A | * | 4/1994 | B60G/17/015 |

* cited by examiner

*Primary Examiner*—Paul N. Dickson
*Assistant Examiner*—David R. Dunn
(74) *Attorney, Agent, or Firm*—Stevens, Davis, Miller & Mosher

(57) ABSTRACT

A method for operating a motor vehicle with a chassis having a suspension device and a damping device according to which, for greater safety, the suspension and/or damping device is stiffened and/or blocked at least for individual wheels when an acceleration signal is applied. The invention also relates to a device with a construction for carrying out the method. The damping device is configured by a hydraulic shock-absorber for each wheel of the motor and at least one shock-absorber can be hydraulically stiffened or blocked via electronically controlled valves. The valve can be controlled by means of a control device connected to at least one acceleration sensor.

9 Claims, 1 Drawing Sheet

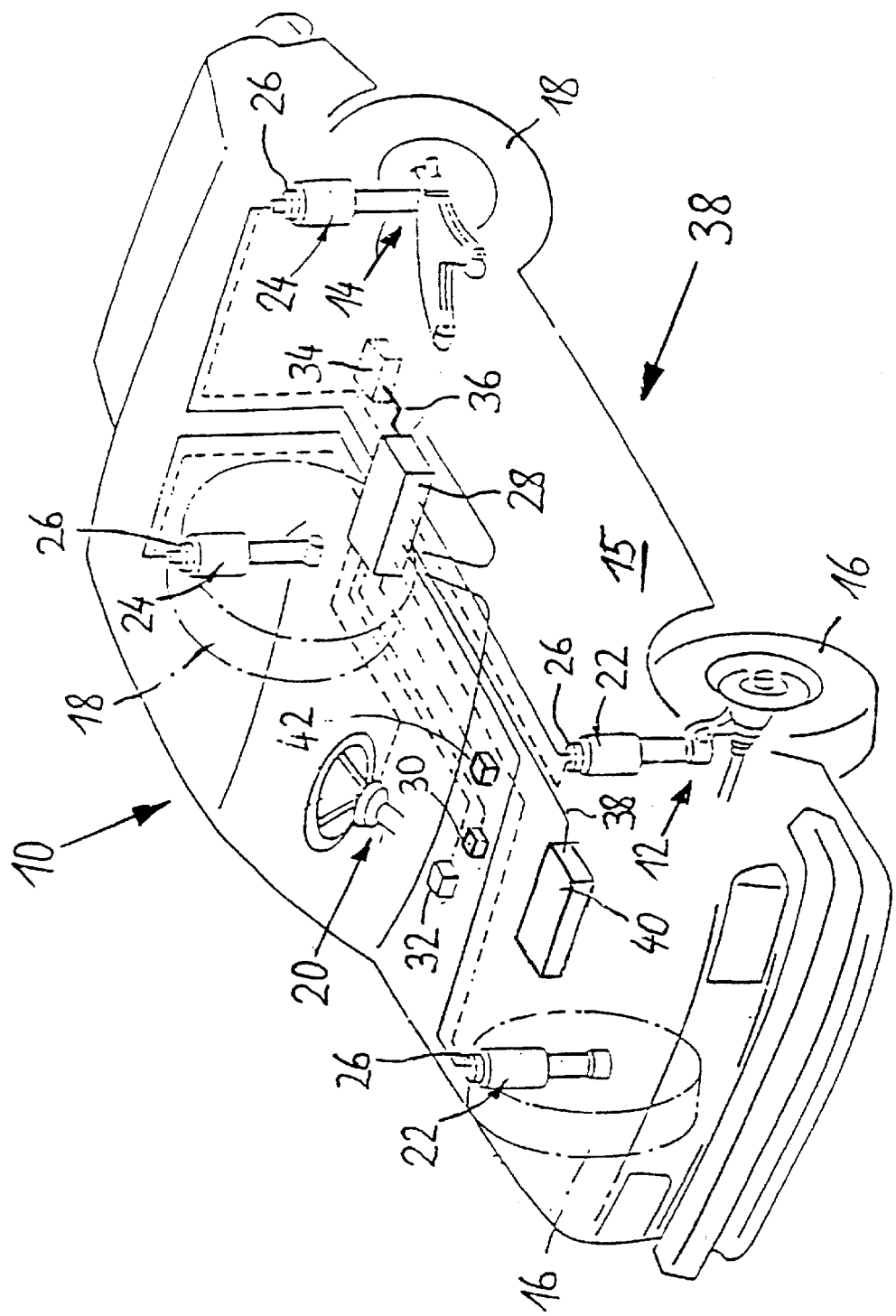

PROCESS AND DEVICE FOR OPERATING A MOTOR VEHICLE

This application is a Continuation Application of application Ser. No. 09/600,699, filed Oct. 5, 2000 which is a 371 of PCT/EP99/00462 filed Jan. 25, 1999.

The invention relates to a process and a device for operating a motor vehicle with a chassis having a spring suspension mechanism and a shock absorption mechanism.

BACKGROUND OF THE INVENTION

Even now current motor vehicles have a large number of control mechanisms, which may be divided roughly into passive and active systems. The interaction of such systems is growing in importance because of the explosive development of data processing. Active or semi-active vehicle control systems are known which, linked electronically to engine and transmission management, control suspension and shock absorption mechanisms on the basis of vehicle-specific parameters and perform functions such as level regulation, anti-skid and antilock control of wheels, and variable shock absorber control (soft setting for comfort or hard as in sports vehicles).

In order to achieve a more compact and more cost-effective suspension and shock-absorption mechanism, DE 40 19 732 A1 even proposes blocking or hydraulically locking the shock absorption mechanism at a specific lateral acceleration value, thereby providing support of the sprung masses for travel on curves at lower system cost. However, the control parameters are determined for specific driving conditions, and so the question is asked whether a solution such as this satisfactorily meets the requirements to be set with respect to travel comfort and performance.

SUMMARY OF INVENTION

The object of this invention is to propose a process whereby the safety of the vehicle can be improved. A process advantageous from the viewpoint of production engineering for application of the process is also proposed.

This object is obtained in the claimed invention by locking the shock absorption mechanism, at least for individual wheels, when an acceleration signal outside normal driving is sensed.

It is claimed for the invention that the effect of oscillation buildup of a motor vehicle structure or body which occurs occasionally in extreme driving situations is prevented. This buildup effect may occur both during full brake application as a result of extreme negative acceleration (deceleration) and during extreme starting acceleration or load alternation (delay in acceleration or vice versa) and may cause dangerous reactions with motorcycles or relatively short vehicles.

This oscillation buildup effect is also harmful in collisions as well, such as a side crash of a motor vehicle. As a result of possibly high impact energy the vehicle may initially dip downward on the impact side, with the wheels accordingly deflecting the springs and storing kinetic energy. Such dipping, in which the vehicle also generally is displaced sideways by sliding of the wheels, is due to the fact that (for example, in collisions with another motor vehicle) the point of impact with the bumper of the colliding vehicle is lower than the center of gravity of the vehicle subjected to impact from the side. During the subsequent displacement of the body in the direction of impact the deflected wheels increase this displacement to a considerable degree, such displacement possibly being magnified by the restoring action of the roll stabilizer, and the vehicle may even overturn in the process. This unstable oscillation may understandably be even more intense if the vehicle is carrying a roof load, since the center of gravity of the vehicle affected is moved farther upward as a result.

It is claimed for the invention that the unstable oscillation effect described above is now eliminated, in that, when the crash signal generated by a conventional method by an impact sensor or acceleration sensor is applied, the spring suspension and/or shock absorption mechanism is locked. The energy stored, possibly in the spring suspension and shock absorption mechanism, is as if it were frozen and is no longer able to apply torque to the instantaneous centers of the chassis or to the rolling axis of the motor vehicle extending through the instantaneous centers. In addition, the lateral stability of the motor vehicle is increased by the locked shock absorbers on the side facing away from the direction of impact.

Experiments have shown that the overturning of a vehicle which may occur under unfavorable circumstances can be efficiently and reliably prevented by application of the process described.

Locking of the spring suspension and/or shock absorption mechanism can itself be accomplished with a chassis having metal springs (such as hydraulic compression springs) and hydraulic-action telescopic shock absorbers by a conventional method, by employing an electrically controllable valve so that the piston with throttling ports of the shock absorber is controlled so that these throttling ports are closed or almost closed when the valve is in one of its switch-controlled positions; the shock absorber is accordingly hydraulically locked or rigidified, a process which is undergone also by the springs kinematically controlled in parallel by switch.

The crash signal may by preference be derived from one or more crash sensors present, for example, if the vehicle is equipped with an air bag system.

Hence cost-effective use may be made of means already present in the motor vehicle as part of its design. All that has to be done is to connect these means to each other suitably.

The same assertion applies equally to a situation in which an antilocking brake system (ABS) is already installed in the vehicle. In this instance a signal may be derived from the ABS if full braking of the vehicle accompanied by suitable ABS control (brake pressure modulation as determined by the positive and negative wheel acceleration values during braking) occurs, optionally supported by a pressure signal from the braking unit (high pressure corresponds to sharp deceleration on a road surface affording good traction).

A separate acceleration sensor may also be used as an alternative or in addition for starting acceleration, but for braking deceleration as well.

BRIEF DESCRIPTION OF THE DRAWINGS

An exemplary embodiment of the invention according to the forgoing is explained and additional details are presented upon consideration of the following description and the accompanying drawing in which:

FIG. 1 shows a phantom view of a motor vehicle with a semi-active chassis and with acceleration sensors which are connected to the electronic control unit of the chassis.

DETAILED DESCRIPTION OF THE INVENTION

The motor vehicle, identified as a unit by 10, has a chassis with front wheel suspensions 12 and rear wheel suspensions 14 which assume the function guidance of the wheels 16, 18 by a conventional process. The front wheels 16 may be steered by steering gear 20 the presence of which is merely indicated. The motor vehicle 10 is provided with an antilocking brake system having a control unit 40. The braking system is of conventional design and accordingly is not illustrated and described.

The spring suspension and shock absorption mechanism for the body 15 of the vehicle has hydraulic telescopic shock absorbers 22, 24 which are in the form of helical pressure springs, not shown, as so-called McPherson strut units. Other shock absorbers and spring assemblies are also conceivable, however, for example, ones such as gas pressure shock absorbers.

The shock absorbers 22, 24 are provided with electrically controllable bypass valves 26 which are connected by electric lines to a central electronic control unit 28.

Hydraulic supply of the shock absorbers 22, 24 of the semi-active chassis shown is performed by conventional means which accordingly are not shown. Such chassis or shock absorbers are described in detail, for example in patents DE 41 05 937 C2 and DE 42 20 617 C1.

The shock absorption property of the shock absorbers 22, 24 may be assigned by way of the valves 26, on the basis of vehicle specific parameters, to the categories "soft, medium, or hard" or "high-comfort, medium, or sports-class."

It is claimed for this invention that the shock absorbers 22, 24 may also be locked by way of the control unit 28 and the electric valves 26, the throttling effect in this instance being virtually infinitely attenuated, so that the shock absorbers 22, 24 are hydraulically locked.

There are mounted in the motor vehicle 10 impact sensors or air bag sensors 30, 32 which are designed by conventional means as acceleration absorbers and which activate the air bag (not shown) by pyrotechnic means by a control unit 34, starting at a specific acceleration value, in the event of longitudinal and/or lateral acceleration of the vehicle 10 on impact with an obstacle or in collision with another colliding vehicle. The deploying acceleration value is of course situated beyond the maximum lateral and longitudinal acceleration values of the vehicle during driving.

The control unit 34 for air bag deployment and the control unit 28 for chassis control are connected to each other by a data line 36. A crash signal is delivered to the control unit 28 over the data line 36, and on the basis of this signal the control unit activates locking of a plurality or all of shock absorbers 22, 24.

If, for example, a transverse acceleration greater than 2 g is measured by the air bag sensor 32, depending on the direction of impact detected (e.g., arrow 38) the control unit 34 generates a signal which as priority activates locking of the shock absorbers 22,24 situated on the right in the direction of travel. As described in the foregoing, this hydraulic locking of the shock absorbers 22, 24 prevents unstable oscillation of the body about the roll axis extending through the roll centers of the wheel suspensions 12, 14 and increases the lateral stability.

It goes without saying that if the direction of impact is on the opposite side shock absorbers 22, 24 are correspondingly activated or locked.

All shock absorbers 22, 24 may, however, also be locked independently of the direction of impact within the framework of the invention; if desired this may also be done in the event of rear collision acceleration proceeding in the longitudinal direction of the vehicle.

Rigidification or locking of the shock absorbers 22, 24 can be eliminated after the crash by means of a time function element in the control unit 28 or by interruption of the operating current circuit (disconnection of ignition).

The control unit 28 is also connected to control unit 40 of the antilocking braking system by another data line 38.

In addition, there is another acceleration sensor 42 mounted in the motor vehicle; it senses longitudinal and transverse acceleration of the vehicle 10 and also delivers a signal to the control unit 28 at a threshold value exceeding the normal acceleration values.

Accordingly, on application of an acceleration value corresponding to extreme starting acceleration, lateral acceleration, and/or braking deceleration and/or a signal from the control unit 40 to control brake locking (full braking), rigidification or locking of the shock absorbers 22, 24 or only of the front shock absorbers 22 in the event of deceleration or of the rear shock absorbers 24 in the event of acceleration and, if applicable, only the shock absorbers 22, 24 on the outside of a curve in the event of transverse acceleration is also triggered.

The important point is that the rigidification or locking of the shock absorbers 22, 24 occurs outside the range of normal operation and so does not affect normal chassis control.

In place of locking of the shock absorbers 22, 24, which is given preference in the event of presence of roof loads carried on a vehicle (ones which may be detected by a load monitoring sensor), when a crash signal is generated also independently of the driving specific parameters of the chassis control system, only rigidification of the shock absorption mechanism (e.g., to the sports vehicle category or even harder) is triggered, which rigidification also counteracts the unstable oscillation effect, possibly to a sufficient extent. Optionally the rigidification or locking of the shock absorbers may additionally be triggered as a function of load, e.g., by means of a load sensor on a roof carrier of the motor vehicle.

I claim:

1. A method of operating a motor vehicle having a plurality of wheels and each wheel is cooperative with a respective shock absorber, including:
   sensing an impact condition representing a collision between said vehicle and a physical object and generating a signal representing said impact condition; and
   locking at least one shock absorber only on a side of said vehicle opposite a side impacted in the event of the collision of said vehicle responsive to said signal.

2. The method according to claim 1, wherein said vehicle includes other safety mechanisms, and including activating said other safety mechanisms responsive to said signal.

3. The method according to claim 1, wherein said vehicle includes at least one air bag sensor to sense said impact condition, operative to generate said signal, and including locking said at least one shock absorber responsive to said signal generated by said air bag sensor.

4. The method according to claim 1, including locking all shock absorbers on a side of said vehicle opposite the side impacted.

5. A method according to claim 1, including discontinuing the locking of said at least one shock absorber after at least one of the expiration of a predetermined interval or in the event of a predetermined condition.

6. A system for operating a vehicle having at least one shock absorber cooperable with a wheel thereof, comprising:

means for sensing an impact condition representing a collision between said vehicle and a physical object, operable to generate a signal representing said impact condition; and means responsive to said signal for locking said at least one shock absorber, wherein only at least one shock absorber on a side of the vehicle opposite said collision is locked during said impact condition.

7. The system according to claim 6, wherein said means for locking include electrically actuated valves for controlling the absorption action of said at least one shock absorber.

8. The system according to claim 6, wherein said means for sensing include at least one air bag sensor.

9. The system according to claim 6, wherein said vehicle has a plurality of wheels, each wheel cooperable with a respective shock absorber.

* * * * *